United States Patent [19]

Kraus

[11] 4,007,520
[45] Feb. 15, 1977

[54] PROCESS FOR THE PRODUCTION OF AN ELECTRIC STACK OR LAYER CAPACITOR

[75] Inventor: Hubert Kraus, Regensburg, Germany

[73] Assignee: Siemens Aktiengesellschaft, Berlin & Munich, Germany

[22] Filed: Dec. 9, 1975

[21] Appl. No.: 639,120

[52] U.S. Cl. .............................. 29/25.42; 83/169; 427/11; 427/79; 427/289

[51] Int. Cl.² ......................................... H01G 4/30

[58] Field of Search .......... 29/25.42; 317/258, 261; 83/169; 427/79, 11, 289

[56] References Cited

UNITED STATES PATENTS

| | | | |
|---|---|---|---|
| 2,726,688 | 12/1955 | Flood | 83/169 |
| 2,731,706 | 1/1956 | Grouse | 29/25.42 |
| 3,614,561 | 10/1971 | Behn et al. | 29/25.42 X |
| 3,670,378 | 6/1972 | Behn et al. | 29/25.42 |
| 3,674,065 | 7/1972 | Fairfield, Jr. et al. | 83/169 X |

Primary Examiner—Carl E. Hall
Attorney, Agent, or Firm—Hill, Gross, Simpson, Van Santen, Steadman, Chiara & Simpson

[57] ABSTRACT

In a process of producing capacitors, synthetic dielectric layers carrying metal layers thereon are wound, in a stretched condition, about a drum to form a mother capacitor. Individual capacitors are then formed from the mother capacitor by sawing, with a rotating saw blade, through the mother capacitor. Due to the heat which is developed during sawing, the stretched layers contract in the region of sawing causing a break up of the metal layers which then oxidize to form insulating islands. This process is improved by applying an insulating lubricant to the saw blade to increase the dielectric strength of the capacitors at the saw cuts.

9 Claims, 1 Drawing Figure

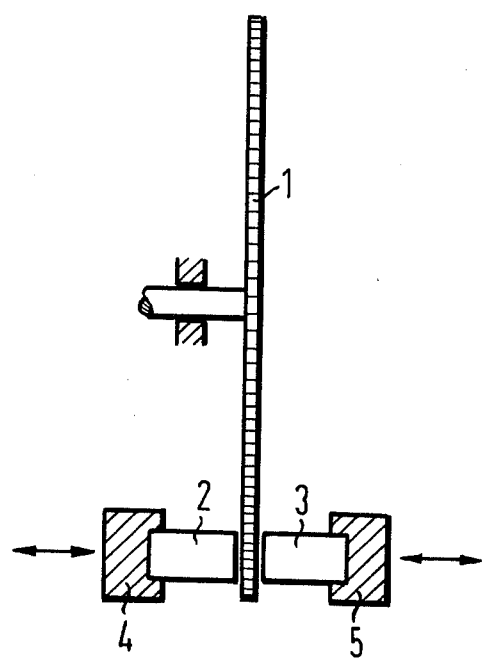

PROCESS FOR THE PRODUCTION OF AN ELECTRIC STACK OR LAYER CAPACITOR

BACKGROUND OF THE INVENTION

1. Field of the Invention

This invention relates to a process for producing capacitors, and is more particularly concerned with a process in which individual layer capacitors are cut from a mother capacitor which has been wound upon a drum.

2. Description of the Prior Art

A process for producing an electrical stack or layer capacitor includes winding, on a drum, synthetic layers, as dielectrics, and having metallizations applied thereto as coatings, to form a mother capacitor. The individual capacitors are separated from the master capacitor by sawing, whereby because of the development of heat during the sawing process, the capacitor foils, which are in a stretched state and capable of contraction, contract in the region of the cut edges thereby causing the coatings in this region to be broken and form islands. The islands, due to oxidation, are insulating islands.

Capacitors produced by the foregoing type of process are well known in the art. In order to achieve a clean contraction of the stretched synthetic material layers, which contraction is necessary for a good insulation of the cut edges, the cutting speed and the execution of the saw are selected in such a fashion that the cut edges are just sufficiently warmed for a contraction. With certain materials, such as polyethylene terephthalate for example, this leads to a melting of the synthetic material layer edges resulting from the saw cut. In this way, the cut edge of the sawed capacitor becomes smeared; the melting synthetic material is carried along by the cutting blade in the operating direction thereof and a burr or fin is formed in the region of the cut surfaces, which burr borders on the actual capacitor and protrudes beyond the actual capacitor in the operating direction of the saw blade. On the other hand, the saw blade gums up after a very short time and must be changed.

SUMMARY OF THE INVENTION

The primary object of the present invention resides in increasing the dielectric strength at the cut edge of a capacitor of the type mentioned above and to thereby avoid the aforementioned disadvantages.

This objective is accomplished, with a stack or layer type capacitor, in that before or during the sawing process, the saw blade is coated with an insulating lubricant.

This process has the advantages that:
The cut surface of the capacitor is not gummed up;
No burr or fin is formed;
The saw blade is not gummed up;
The saw blade does not warp during sawing as a result of the cooling effect of the lubricant; and
The cut surface of the capacitor is impregnated during sawing, whereby an increase in the dielectric strength is made possible.

On the other hand, on the basis of the increased dielectric strength, the heating can be somewhat decreased by corresponding sawing conditions, which even further promotes the accomplishment of the above proposed object.

The process is advantageously executed by using waxes, oils or greases as lubricants. Waxes are advantageously pressed, briefly, in a solid state, against a rotating circular saw blade from both sides. Expediently this takes place simultaneously on both sides of the saw blade so that the saw blade is not subjected to any bending stress. The wax is also expediently applied, between two cutting operations, by the pressure application of the ends of wax rods, and the amount of wax to be applied is dosed by the time of application.

A commercially common, circular metal saw blade 0.5 mm thick, fine toothed, 100 mm $\phi$ is recommended as a suitable saw blade.

BRIEF DESCRIPTION OF THE DRAWING

Other objects, features and advantages of the invention, its organization, construction and operation will be best understood from the following detailed description taken in conjunction with the accompanying drawing on which there is a single FIGURE which illustrates a rotatable saw blade and a pair of wax applying members.

DESCRIPTION OF THE PREFERRED EMBODIMENT

Referring to the drawing, a saw blade 1 is mounted for rotation and runs between two wax rods 2 and 3 which are held in respective mounts 4 and 5. The ends of the wax rods 2 and 3 can be pressed, simultaneously, against the saw blade or, respectively, removed from the saw blade in the directions indicated by the double headed arrows. The thickness of the wax rods 2 and 3 corresponds approximately to the depth of penetration of the saw blade into the capacitor to be cut.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a process of producing capacitors in which synthetic dielectric layers carrying metal layers thereon are wound in a stretched state about a drum to form a mother capacitor, in which individual capacitors are formed from the mother capacitor by sawing through the mother capacitor, and in which due to the development of heat during sawing the capacitor layers contract in the region of sawing causing breaking of the metal layers to form insulating islands, the improvement therein comprising the step of:
applying an insulating lubricant to the saw blade and performing said sawing step such that said lubricant impregnates the capacitor being formed and thereby increases its dielectric strength.

2. The improved process of claim 1, wherein the step of applying an insulating lubricant is further defined as applying the lubricant to the saw blade before sawing.

3. The improved process of claim 1, wherein the step of applying an insulating lubricant is further defined as applying the lubricant during sawing.

4. The improved process of claim 1, further defined by the steps of:
rotating a circular saw blade; and applying the lubricant simultaneously to both sides of the saw blade.

5. The improved process of claim 4, wherein the step of applying lubricant is further defined as:
applying lubricant over an area on each side of the saw blade from the periphery toward the axis of rotation to a distance of at least the depth of penetration
of the saw blade into the mother capacitor.

6. The improved process of claim 4, wherein the step of applying is further defined by:
pressing wax against each side of the saw blade between two sawing operations.

7. The improved process of claim 1, wherein the step of applying an insulating lubricant is further defined as:
applying a wax to the saw blade.

8. The improved process of claim 1, wherein the step of applying an insulating lubricant is further defined as:
applying an oil to the saw blade.

9. The improved process of claim 1, wherein the step of applying an insulating lubricant is further defined as:
applying a grease to the saw blade.

* * * * *